US008572175B2

(12) United States Patent
Lamb et al.

(10) Patent No.: US 8,572,175 B2
(45) Date of Patent: Oct. 29, 2013

(54) USER INTERFACE FOR A COMMUNICATION DEVICE

(75) Inventors: Duncan Lamb, Tallinn (EE); Marek Laasik, Tallinn (EE); Manrique Brenes, Corona del Mar, CA (US); Gareth O'Loughlin, London (GB)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 12/226,259

(22) PCT Filed: Apr. 5, 2007

(86) PCT No.: PCT/GB2007/001301
§ 371 (c)(1),
(2), (4) Date: Feb. 9, 2009

(87) PCT Pub. No.: WO2007/116214
PCT Pub. Date: Oct. 18, 2007

(65) Prior Publication Data
US 2009/0176574 A1 Jul. 9, 2009

(30) Foreign Application Priority Data
Apr. 10, 2006 (GB) .................................. 0607191.4

(51) Int. Cl.
*G06F 15/16* (2006.01)
(52) U.S. Cl.
USPC ........................................ 709/205; 709/204
(58) Field of Classification Search
USPC .................................. 709/205, 204
See application file for complete search history.

(56) References Cited

U.S. PATENT DOCUMENTS

| 6,868,283 | B1* | 3/2005 | Bonansea et al. ............. 455/566 |
| 6,882,709 | B1 | 4/2005 | Sherlock et al. |
| 6,952,414 | B1 | 10/2005 | Willig |
| 7,266,834 | B1 | 9/2007 | Lund et al. |
| 2002/0061095 | A1 | 5/2002 | Beecroft |
| 2002/0065111 | A1* | 5/2002 | Otsuka et al. ................. 455/566 |
| 2002/0094069 | A1 | 7/2002 | Takahashi et al. |
| 2002/0149705 | A1 | 10/2002 | Allen et al. |
| 2003/0041332 | A1 | 2/2003 | Allen et al. |
| 2006/0020993 | A1 | 1/2006 | Hannum et al. |

(Continued)

FOREIGN PATENT DOCUMENTS

| AU | 2007235658 | 7/2012 |
| CA | 2649181 | 10/2007 |

(Continued)

OTHER PUBLICATIONS

European Search Report issued in European Patent Application No. EP 09 07 5078.7-2414, dated Apr. 21, 2009, 8 pages.

(Continued)

*Primary Examiner* — Hee Soo Kim
(74) *Attorney, Agent, or Firm* — Wolfe-SBMC

(57) ABSTRACT

A device for use in a communication system the device comprising processing means arranged to execute first and second applications, and first and second interface means, the first application for detecting a communication event, the second application comprising means for controlling the second interface to allow a user to use the second application; wherein the first application is arranged to control first interface means to indicate to a user of the device that the communication event has occurred, when the second application is running.

18 Claims, 2 Drawing Sheets

(56) References Cited

U.S. PATENT DOCUMENTS

| | | | |
|---|---|---|---|
| 2006/0040638 A1* | 2/2006 | McQuaide, Jr. | 455/403 |
| 2006/0053447 A1 | 3/2006 | Krzyzanowski et al. | |
| 2006/0229099 A1* | 10/2006 | Chen et al. | 455/556.1 |
| 2007/0250845 A1 | 10/2007 | Walter et al. | |
| 2012/0159559 A1 | 6/2012 | Lamb et al. | |

FOREIGN PATENT DOCUMENTS

| | | | |
|---|---|---|---|
| CN | 101455062 | | 6/2009 |
| EP | 1 768 364 | A2 | 3/2007 |
| GB | 2 387 071 | A | 10/2003 |
| GB | 2437592 | | 10/2007 |
| JP | 11041636 | | 2/1999 |
| JP | 2001-333153 | A | 11/2001 |
| JP | 2002354542 | | 12/2002 |
| JP | 2003 319020 | A | 11/2003 |
| JP | 2004-7144 | A | 1/2004 |
| JP | 2005039540 | | 2/2005 |
| JP | 2006-20250 | A | 1/2006 |
| JP | 2006148741 | | 6/2006 |
| JP | 2006218879 | | 8/2006 |
| JP | 2007087402 | A | 4/2007 |
| JP | 2009536759 | | 10/2009 |
| JP | 2011120287 | | 6/2011 |
| KR | 2005-0088733 | * | 3/2007 |
| WO | WO 01/58156 | A1 | 8/2001 |
| WO | WO 02/30121 | A1 | 4/2002 |
| WO | WO 2005/009019 | A | 1/2005 |
| WO | WO-2007116214 | | 10/2007 |

OTHER PUBLICATIONS

Schmandt, C., et al., "Mediated Voice Communication Via Mobile IP," *Proc. of the 15th Annual ACM Symposium on User Interface Software and Technology*, Paris, France, Oct. 27-30, 2002, ACM Symposium on User Interface Software and Technology, New York, NY: ACM, US, vol. Conf. 15, Oct. 27, 2002, pp. 141-150.

Dybwad, B., "Nintendo @ E3—Dspeak: VoIP via Nintendo DS," Engadget, [online] May 20, 2005 [retrieved on Jul. 5, 2007]. Retrieved from the Internet: <URL: http://www.engadget.com/2005/05/20/nintendo-e3-dspeak-voip-via-nintendo-ds/>.

European Search Report, issued in European Patent Application No. 09075326.0-2414, dated Oct. 1, 2009, 7 pages.

Eitaro Saito, "Free internet telephone, Throughout analyses on Skype, Figure out three mysteries", Nikkei Network, vol. 62, Japan, *Nikkei Business Publications, Inc.*, pp. 52 to 57, May 22, 2005.

Ayumu Takahashi, "How to use Skype as free telephone", Nikkei PC21, vol. 10, No. 17, Japan, *Nikkei Business Publications, Inc.*, pp. 122 to 123, Jul. 28, 2005.

"International Search Report & Written Opinion", Application No. PCT/GB2007/001301, (Jul. 19, 2007), 9 pages.

"Search Report under Section 17", Application No. GB0607191.4, (Aug. 6, 2007), 1 page.

"Foreign Office Action", CN Application No. 200780018954.3, (Dec. 25, 2012), 37 pages.

"Foreign Notice of Allowance", Australian Application Number, (Oct. 28, 2011),3 pages.

"Foreign Office Action", Australian Application No. 2007235658, (Aug. 16, 2010), 2 pages.

"Foreign Office Action", Chinese Application No. 200780018954.3, (Jun. 9, 2011), 10 pages.

"Foreign Office Action", Chinese Application No. 200780018954.3, (Mar. 26, 2012), 12 pages.

"Foreign Office Action", Chinese Application No. 200780018954.3, (Sep. 13, 2012), 4 pages.

"Foreign Office Action", European Application No. 07732345.9, (Jul. 20, 2011), 6 pages.

"Foreign Office Action", European Application No. 07732345.9, (Nov. 29, 2011), 6 pages.

"Foreign Office Action", Japanese Application No. 2009-504808, (Aug. 9, 2011), 7 pages.

"Foreign Office Action", Japanese Application No. 2009-504808, (Nov. 29, 2011), 6 pages.

"Foreign Office Action", JP Application No. 2009-504808, (Sep. 4, 2012), 8 pages.

"Foreign Office Action", JP Application No. 2011-245540, (Mar. 12, 2013), 6 pages.

"Non-Final Office Action", U.S. Appl. No. 13/404,791, (Apr. 2, 2013), 11 pages.

"Final Office Action", U.S. Appl. No. 13/404,791, (Jul. 19, 2013), 12 pages.

* cited by examiner

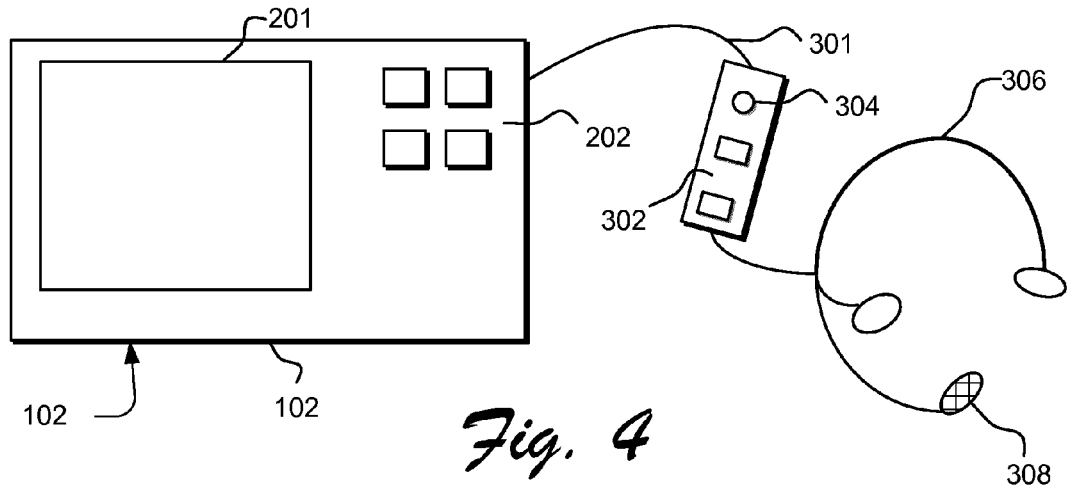
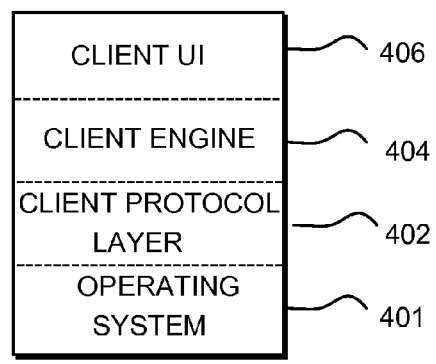
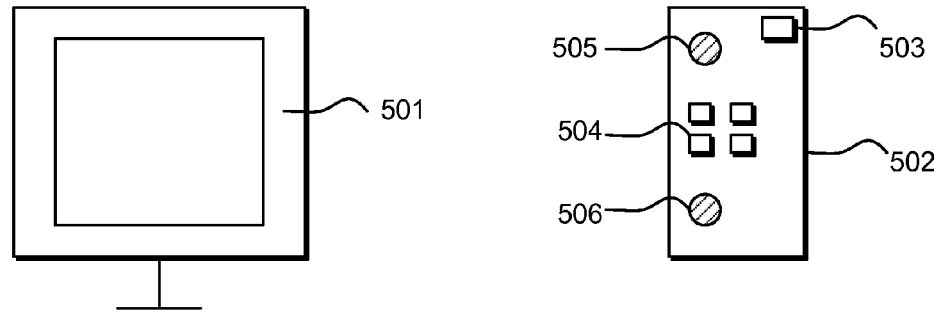

USER INTERFACE FOR A COMMUNICATION DEVICE

RELATED APPLICATION

This application is the U.S. National Stage of International Application No. PCT/GB2007/001301, filed Apr. 5, 2007, published in English, and claims priority under 35 U.S.C. § 119 or 365 to Great Britain Application No. 0607191.4, filed Apr. 10, 2006.

FIELD OF THE INVENTION

The present invention relates to a user interface for handling a communication event in a communication system. In particular the invention relates, but not exclusively to controlling an interface in a communication system.

BACKGROUND OF THE INVENTION

In a communication system a communication network is provided, which can link together two communication terminals so that the terminals can send information to each other in a call or other communication event. Information may include voice, text, images or video.

One such communication system is a peer to peer communication system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer telecommunications are beneficial to the user as they are often of significantly lower cost than traditional telephony networks, such as fixed line or mobile networks. This may particularly be the case for long distance calls. These systems may utilise voice over internet protocol ("VoIP") over an existing network (e.g. the Internet) to provide these services, although alternative protocols can also be used.

In a communication system, such as a peer to peer system, client software is installed on end user devices such as personal computers (PCs) to allow the end users to communicate via the communications network. The user interface of the client software can be controlled by the client to display user facilities and to indicate events occurring, such as an incoming call.

The inventors of the present invention have identified that it may not always be possible for the client to display information on the end user device when required, for example when receiving an incoming call. This may be due to a different application running on the device which cannot be interrupted or the user interface of the device, such as the monitor of a PC being switched off. It also may not be possible for the client to display information due to the constraints of the operating system of the device, such as mobile game playing consoles. This prevents the user from using the communication system.

It is therefore an aim of embodiments of the invention to address at least one of the above identified problems.

SUMMARY OF THE INVENTION

According to the present invention, there is provided a device for use in a communication system the device comprising; processing means arranged to execute first and second applications, and first and second interface means, the first application comprising a first layer for detecting a communication event and controlling the first interface means to indicate to a user of the device that the communication event has occurred, the second application comprising means for controlling the second interface to allow a user to use the second application the first application including a second layer for handling the communication event, wherein the device comprises means operable to close the second application in order for the processing means to execute the second layer of the first application.

BRIEF DESCRIPTION OF DRAWINGS

For a better understanding of the present invention and as to how the same may be carried into effect, embodiments of the present invention will now be described with reference to the following drawings:

FIG. 3 is a schematic representation of a user device with a detachable interface according to an embodiment of the present invention;

FIG. 4 shows a client stack according to an embodiment of the present invention;

FIG. 5 is a schematic representation according to an embodiment of the present invention.

DETAILED DESCRIPTION

Figure 1:
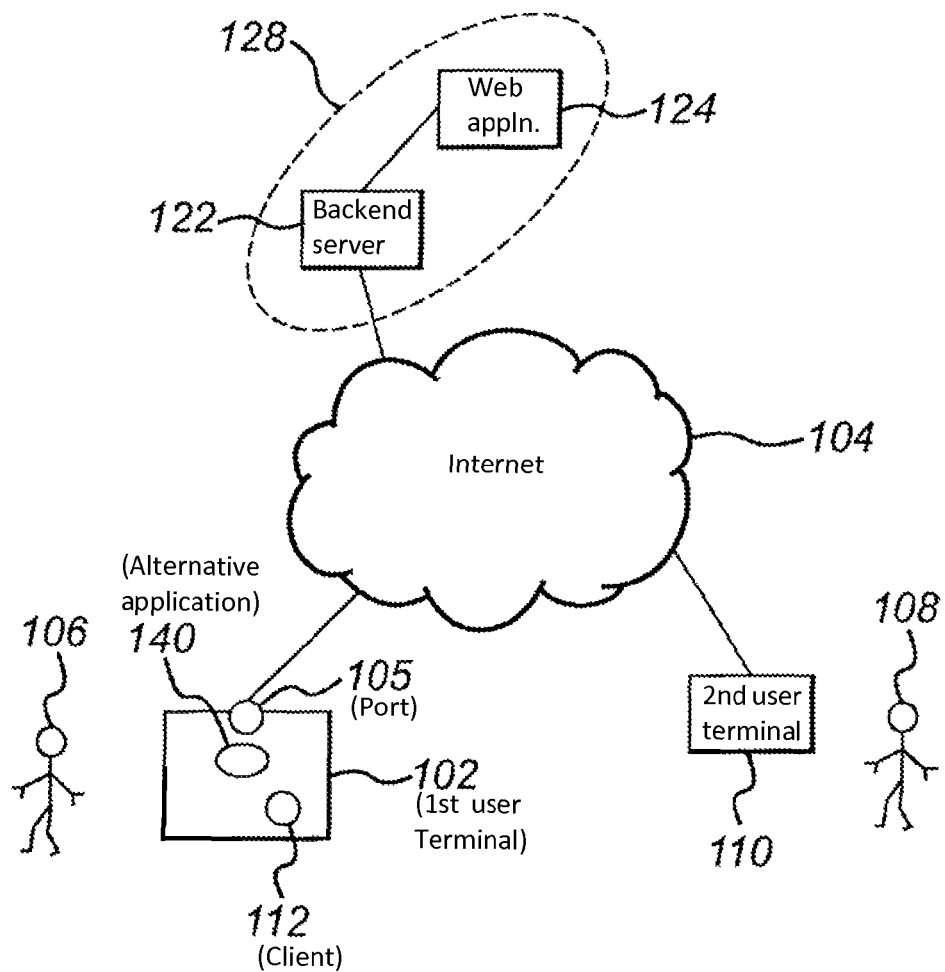
FIG. 1 is a schematic representation of a peer to peer telephony system.

Reference will first be made to FIG. 1, in which is shown a peer-to-peer telephony system 100. It should be appreciated that even though the exemplifying telecommunications network shown and described in more detail uses the terminology of a peer to peer network, embodiments of the present invention can be used in any other suitable form of network.

A user terminal 102 is shown connected to a network 104. The user terminal may be, for example, a personal computer, a gaming device, a personal digital assistant, a suitably enabled mobile phone, a television or other device able to connect to the network 104. The user terminal 102 is connected to the network 104 via a network port 105, and may be via a cable (wired) connection or a wireless connection. The network 104 may be a network such as the Internet. If the user terminal is connected to the network 104, then it may be running a client program 112 provided by the operator of the peer-to-peer telephony system. The client 112 is a software program executed on a local processor in the user terminal 102. The client 112 has a number of different components or layers for implementing various functions, including a protocol layer 402 (FIG. 4) for managing the network interface.

FIG. 4 shows a client stack according to an embodiment of the present invention. As shown the client protocol layer sits on top off the operating system 401 of the device. Above the protocol layer 402 is the client engine 404. The client engine 404 is used to control the client user interface layer 406. The client user interface layer may include software for controlling a main interface and separate software for controlling an alternative interface. The control of the client user interface 406 will be explained in more detail hereinafter.

In an embodiment of the invention the present invention both the client protocol layer 402 and the client engine layer 404 are arranged to run on the device when the terminal is either not engaged in a call over the communication network, or when an alternative application is running on the user terminal. The protocol layer and client engine layer may be arranged to run either when the user terminal is switched on, or when the user switches on the communication functionality on the terminal.

According to one embodiment of the invention, also connected to the network 104 are a backend server 122 and a web application 124. The backend server 122 and the web application 124 may be located within the private network 128 of the operator of the telephony system. The backend server 122 and the web application 124 may be geographically co-located, or may be geographically separated. The backend server 122 is located between the web application 124 and the network 104, and is responsible for exchanging messages between the web application 124 and the client 112. The backend 122 and the client 112 communicate using a proprietary protocol, and do not use HTTP. This is to avoid the detection and blocking of HTTP messages by third parties and firewalls. Furthermore, the backend server 122 also blocks HTTP.

In order to be able to communicate across the network, the user 106 must be suitably registered and authenticated. Access is checked using public key cryptography. The protocol layer of the client 112 may be arranged to periodically poll the backend server 122 using the protocol for a new version of the public key. The backend server 122 forwards the request to the web application 124. The web application 124 returns the key to the backend server 122 in step, and this is passed to the client 112 using the protocol in a user identity certificate (UIC). The above steps are performed periodically, without the user being aware of its operation, in order to ensure that the key information is always up to date in the client 112.

A user of a second user terminal 110 can make a telephone call to the user of the user terminal 102 across the network 104. To initiate the call, the second user 108 can click on the contact listed for the user 106 displayed in a client running on the second user terminal similar to the client running on the user terminal 102. Alternatively the user 108 can type in a telephone number or username for the user 106. The client then sets up the call to the user 106. The telephone call may be made using VoIP, in accordance with methods known in the art, such as disclosed in WO 2005/009019. The telephone call may comprise voice, video, instant messaging ("IM"), short message service (SMS) or a combination thereof.

In an alternative embodiment the second user terminal 110 may be connected to a different network such as the public switched telephone network ("PSTN") or a mobile network (not shown in FIG. 1). If connected to the PSTN, the second user terminal may be a fixed line telephone, and if connected to a mobile network, the second user terminal may be a mobile telephone.

Figure 2:
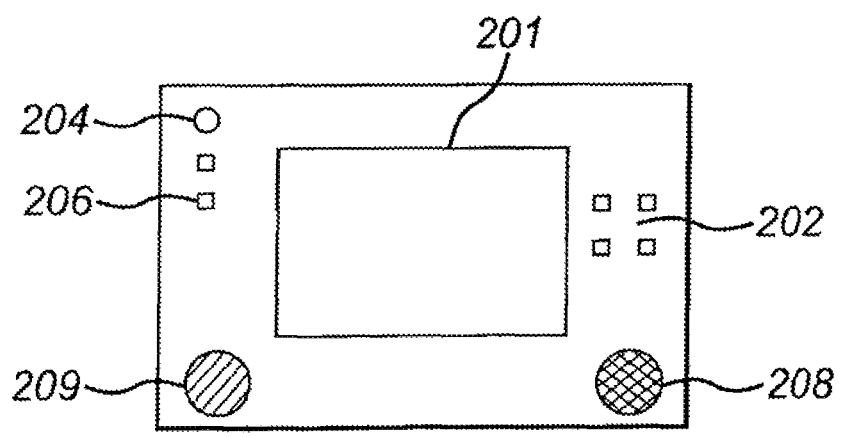
FIG. 2 is a schematic representation of a user device according to an embodiment of the present invention.

FIG. 2 shows a schematic representation of a user device in accordance with an embodiment of the present invention. When the client software is run on the user device as a dedicated application the main user interface of the device, such as the screen 201 may be controlled by the client engine 404 via the client user interface layer 406.

When a communication event such as an incoming call is signalled via the network to the user device, the client protocol layer 402 is arranged to receive the notification from the network and to control the client engine 404 accordingly. If the main user interface of the device is available, the client engine may be arranged to control the main user interface, for example the screen 201, via the client user interface layer to notify the user of the incoming call. The user may then accept the incoming call by using the function buttons 202 provided on the user device 102.

Accordingly when the main user interface is available, the client application may be run as a dedicated application. In this case the client engine is arranged to control the user interface layer 406 to execute the software for controlling the main user interface.

However, it is possible that the user device 102 may be running an alternative application 140 such as a games application at the time of receiving an incoming call. Accordingly the display 201 and function keys 202 of the user device may be dedicated to the operation of the games application. This may be due to the capacity of the system or that either the user or the manufacturer has chosen that the games application 140 should not be interrupted.

When the user device is running the alternative application 140 and the protocol layer is notified by the network of an incoming call, the protocol layer notifies a client application engine installed in the device 102 that there is an incoming call. The client engine is also notified that the main user interface is unavailable. The client engine is configured to control an alternative interface means via the client user interface upon notification that the main user interface is unavailable, or upon notification that the alternative application 140 is running. In one embodiment of the invention the client engine is dynamically configured to control the alternative user interface upon receiving notification from the operating system that the main user interface is unavailable after the client engine has attempted to control the main interface.

Accordingly when the main user interface is unavailable, the client application may not be run as a dedicated application. In this case the client engine is arranged to control the user interface layer 406 to execute the software for controlling the alternative user interface.

The alternative interface may comprise outputting a signal to an LED 204 provided on the device. Accordingly when the LED lights up the user of device 102 knows that an incoming call has been received.

In an alternative embodiment of the invention the client engine may output a signal to a buzzer or a speaker 208 to indicate that the user has received a call.

In an alternative embodiment of the invention the network may notify the client protocol layer of an incoming voicemail or SMS. The protocol layer may then notify the client engine that a voicemail has been received.

In an alternative embodiment, of the invention a separate alternative interface may be used to indicate an incoming call, a voicemail and an SMS. For example the incoming call may be indicated by an LED and a voicemail may be indicated by a buzzer.

In one embodiment of the invention the user may immediately close the alternative application 140 and run the client as a dedicated application to receive the call. Interruption of the alternative application 140 may be achieved using the function keys 202 or alternative interface function keys 206. A voice call may then be conducted using the speaker 208 and microphone 209.

In an embodiment of the invention, the interface dedicated to the alternative application 140, (i.e. the display 201 and function keys 202) does not respond to the client 122 until after the alternative application 140 is closed.

In a further alternative embodiment of the invention the notification of a communication event to the client protocol layer may cause the device to immediately close the alternative application 140 and to run the client as a dedicated application using the main user interface.

Reference is now made to FIG. 3 which shows a user device 102 with a detachable alternative interface 301. The detachable alternative interface comprises function keys 302, LED 304, head phones 306 and microphone 308.

The detachable interface 301 may be attached via a USB connection and/or by an audio jack connection (not shown). In an alternative embodiment the detachable interface may be connected to the user device via a blue tooth connection. It is possible to connect the detachable device via any wired or wireless means capable of transmitting digital information.

According to this embodiment of the invention the client engine is arranged to output a signal to the LED 304 or the headphones 306 to indicate an incoming call, or a voicemail. The user may then close the alternative application 140 running on the device 102 and launch a dedicated client application controlling the main interface using function keys 302.

In an alternative embodiment of the present invention the device may contain two display screens: a main display screen and an alternative display screen. When the client receives notification that the main screen is unavailable when receiving an incoming call, the client engine is arranged to control the user interface layer to operate the alternative display screen to indicate an incoming call or other communication event to the user. The use of a screen allows information such as caller identity to be displayed.

In this embodiment the alternative application and the client may both be fully operational on the device and use two separate display screens.

In an alternative embodiment of the present invention, the device may comprise a television 501 as shown in FIG. 5. The detachable interface is provided on the remote control 502 of the television.

The client is installed at the television. When the network notifies the client of the incoming call and the client engine is notified that the television screen is unavailable due to the television 501 displaying television broadcasts, the client engine communicates via the user interface layer on a wireless link to control the detachable interface provided on the remote control 502. The detachable interface may include an LED 503 which is used to signal an incoming call. The user may accept the incoming call by using the function buttons 504 on the remote control 502 to exit the television broadcast and use the instructions displayed on the television screen to accept the incoming call.

In an alternative embodiment of the invention the user may accept the call without using the main interface on the television screen. In this embodiment the user may accept the call using the function buttons 504 on the remote control and conduct the call using a microphone 506 and speaker 505 included on the remote control.

In an alternative embodiment of the present invention it is possible to have the alternative application and the client running fully on the device 102. According to this embodiment the user may conduct a call whilst using the alternative application 140, the call and the alternative application using two separate interfaces.

While this invention has been particularly shown and described with reference to preferred embodiments, it will be understood to those skilled in the art that various changes in form and detail may be made without departing from the scope of the invention as defined by the claims.

The invention claimed is:

1. A device comprising:
   a processor configured to execute first and second applications;
   a user interface and a screen,
   the first application configured to detect a call, the first application comprising a voice over internet protocol (VoIP) client;
   the second application configured to control the user interface to allow a user to use the second application;
   wherein when the second application is not running, the first application is configured to control the user interface to indicate to a user of the device that the call has been detected;
   wherein when the second application is running, the user interface is dedicated to operation of the second application, the user interface thus being unavailable to indicate to the user that the call has been detected; and
   the first application being configured to:
      make an attempt to control the user interface to indicate the call to the user;
      responsive to the attempt being made to control the user interface, receive, from an operating system of the device, a notification that the second application is running and that the user interface is unavailable to indicate the call to the user;
      in response to receiving the notification, control the screen to indicate to the user of the device that the call has been detected; and
      in response to a user selection to accept the detected call, accept the call to enable performance of the call while concurrently using the second application.

2. The device of claim 1, further comprising a first component including the screen, and a second component, wherein the first and second components are detachable.

3. The device of claim 1 wherein the first application is a peer to peer client application.

4. The device of claim 1 wherein the second application is a games application.

5. The device of claim 1 wherein the device is a games console.

6. The device of claim 1, wherein the screen is further configured to interface with headphones.

7. The device of claim 1 wherein the user interface comprises an additional screen.

8. A method comprising:
   detecting a call in a first application that is executed by a device configured to execute the first application and a second application, the first application comprising a voice over internet protocol (VoIP) client, the second application having a user interface that is displayable on a display screen of the device, the second application configured to control a display on the display screen to allow a user of the device to use the second application;
   responsive to detecting the call, making, by the first application, an attempt to control the first display screen to indicate said call to the user;
   responsive to the attempt being made by the first application to control the first display screen, receiving, at the first application and from an operating system of the device, a notification that the second application is running and the first display screen is unavailable to indicate said call to the user, the first display screen being controlled by the first application when the second application is not running and dedicated to operation of the second application when the second application is running;
   responsive to receiving the notification, controlling a display of a second display screen of the device by the first application to indicate to the user of the device that the call has been detected; and responsive to a user input, accepting the call and allowing the user to conduct the call while concurrently using the second application.

9. A method as recited in claim 8, wherein when the second application is not running, indicating by the first application via the display of the first display screen that the call has been detected.

10. A method as recited in claim 8, wherein the first application comprises a peer to peer client application.

11. A method as recited in claim 8, wherein the second application comprises a games application.

12. A method as recited in claim 8, wherein the call is conducted using the second display screen while the second application concurrently uses the first display screen.

13. A computer program product in the form of a first application embodied on one or more computer-readable media devices, the computer program product comprising program code that is executable by a device to perform a method, the method comprising:

detecting a call in a first application executed on the device, the device being configured to execute both the first application and a second application, the first application comprising a voice over internet protocol (VoIP) client, the device comprising a first display screen that is controllable by the second application; and making an attempt, by the first application, to control the first display screen to indicate to a user of the device that the call has been detected;

responsive to the attempt being made to control the first display screen, receiving a notification from an operating system of the device that the second application is running and the first display screen is unavailable to indicate said call to the user;

responsive to receiving the notification, controlling a second display screen of the device by the first application to indicate to the user of the device that the call has been detected, the second application having a user interface that is displayed on the first display screen when the second application is running, wherein when the second application is not running, the first application is configured to control the first display screen to indicate to the user of the device that the call has occurred; and accepting the call responsive to a user input and allowing the user to conduct the call while concurrently using the second application.

14. A computer program as recited in claim 13, wherein the call is conducted using the second display screen while the second application concurrently controls the first display screen.

15. A computer program as recited in claim 13, wherein the first application comprises a peer to peer client application.

16. A computer program as recited in claim 13, wherein the second display screen is configured to interface with headphones.

17. A computer program as recited in claim 13, wherein the second application is a games application.

18. A computer program as recited in claim 13, wherein when the second application is running, the first display screen and one or more function keys of the device are dedicated to operation of the second application.

* * * * *